Oct. 4, 1960 E. O. KEIZER 2,955,152

COLOR TELEVISION RECEIVER WITH COLOR BALANCE CONTROL

Filed Dec. 29, 1954 3 Sheets-Sheet 1

INVENTOR.
EUGENE O. KEIZER
BY
[signature]
ATTORNEY

INVENTOR.
EUGENE O. KEIZER
BY
Olin J. Mitchell
ATTORNEY

INVENTOR.
EUGENE O. KEIZER
BY [signature]
ATTORNEY

United States Patent Office 2,955,152 Patented Oct. 4, 1960

2,955,152

COLOR TELEVISION RECEIVERS WITH COLOR BALANCE CONTROL

Eugene O. Keizer, Princeton, N.J., assignor to Radio Corporation of America, a corporation of Delaware Filed Dec. 29, 1954, Ser. No. 478,266

9 Claims. (Cl. 178—5.4)

The present invention relates to color balance and more particularly to the balancing of color components in the chrominance signal of the composite color television signal.

The chrominance signal is a suppressed carrier type subcarrier wave modulated by a plurality of color difference signals of unequal relative amplitudes.

Before color difference signals can be utilized to provide acceptable reproduction of the transmitted color image in some types of color image reproducers, it is desirable to balance the relative amplitude levels of the color difference signals.

A primary object of this invention is to provide improved color balance in color television receivers.

It is another object of this invention to provide for control of the relative color difference signal amplitudes in color television receivers.

According to the invention, color balance is obtained by changing the instantaneous relative amplitude of the color difference signals as represented in the chrominance signal channel.

Other and incidental objects of this invention will become apparent from a study of the following detailed description of the accompanying drawings in which.

Before entering upon a discussion of the present invention, consider first some aspects of the color television signal which relate directly to the teachings of the present invention. The luminance or monochrome information (Y signal) which represents the relative luminance or brightness information of the scene is made up of component color signals according to the proportions of 59% green, 30% red and 11% blue.

The color or chrominance information is transmitted in the form of color difference signals which indicate how each color in the televised scene differs from the color content of the corresponding color in the luminance signal. Color difference signals of the type such as $R-Y$, $G-Y$ and $B-Y$, to name only a few of the wide variety of hues and color difference signals which are transmitted, are included on a suppressed carrier modulated color subcarrier whose modulation phase yields an indication of hue through a wide gamut of colors and whose amplitude yields an indication of color saturation. Color difference signals are available in the modulated color subcarrier either simultaneously or sequentially by utilizing suitable continuous or sequential processes of synchronous detection or envelope sampling at phases which are directly related to the hue or color difference signals desired.

Color difference signals of the type such as $R-Y$, $B-Y$ and $G-Y$ do not exist at identical relative amplitudes in the modulated color subcarrier. The terminology, relative amplitude of a color difference signal, refers to the amplitude of that color difference signal as compared to the amplitude of the luminance signal for the condition whereby that color difference signal results in a saturated color. For example, the amplitudes of the $R-Y$, $B-Y$ and $G-Y$ color difference signals are related according the proportions 0.877, 0.493, and 1.423 respectively, for reproducing saturated primaries and their complements. If the color subcarrier is demodulated to produce these signals, with these signals utilized for reconstruction of the transmitted color image, then, regardless of whether this utilization be in terms of continuous color difference signals or in terms of a prescribed sequence of color difference signals, it is important that these variations and relative amplitudes be taken into consideration.

Once the color difference signal information has been recovered, it is then combined with the Y information in a suitable adder circuit, or possibly in the control structure of the color image reproducer itself by applying the Y information, for example, to the cathode and the $R-Y$, $B-Y$ and $G-Y$ color difference signals to suitable control electrodes.

The present invention in one of its forms, is concerned with color television receivers employing color image reproducers requiring a sequence of properly balanced color image information applied to appropriate control electrodes of the color image reproducer.

Figure 1:
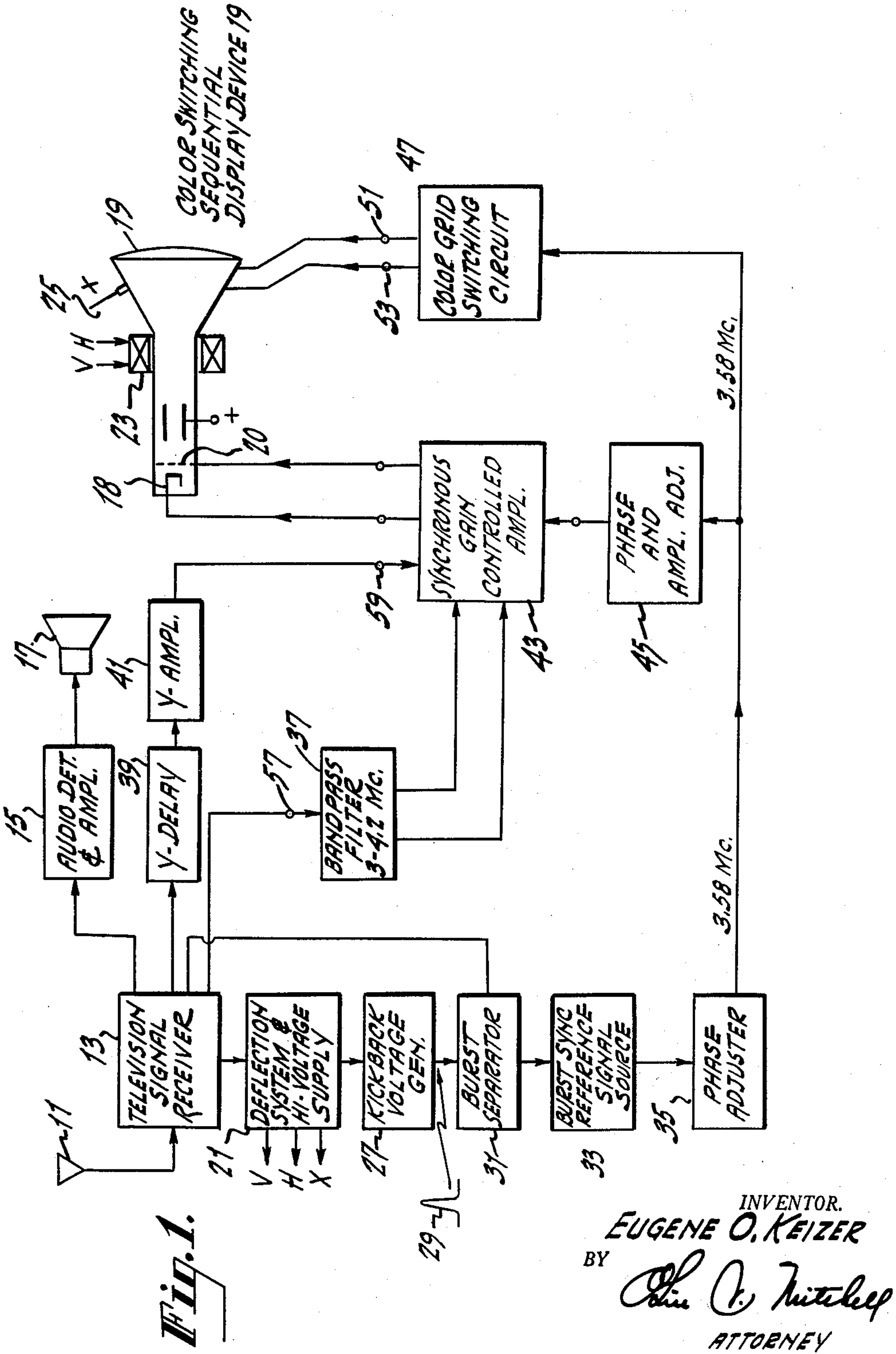
Figure 1 shows a block diagram of one embodiment of the present invention.

Consider first the embodiment of the present invention as incorporated in the color television receiver circuit diagram shown in Figure 1. This circuit operates in conjunction with a color switching sequential display device 19 of the type which performs the function of directing the electron beam to selected elemental areas of an image target in synchronism with a sequential color information signal which is applied to the control grid 20 and the cathode 18.

The incoming television signal arrives at the antenna 11 and is applied to the television signal receiver 13. The television signal receiver 13 includes the functions of first detection, intermediate frequency amplification, second detection, and automatic gain control. Many of these functions are described, for example, in Chapter 22 of the book, "Harmonics, Sidebands and Transients in Communication Engineering," by C. Louis Cuccia, published by the McGraw-Hill Book Company in 1952.

Sound information may be recovered by utilizing, for example, the well known principles of intercarrier sound in the detector and amplifier 15; the recovered and amplified sound information is then applied to the loud speaker 17.

The color television signal is accommodated in at least four channels of the color television receiver. These channels are employed for delivering the luminance, chrominance and deflection signals to the color switching sequential display device 19 and its deflection yokes 23.

The deflection system and high voltage supply 21 not only supply the vertical and horizontal deflection signals to the yokes 23 but also high voltage to the ultor 25 and provides for energizing the kickback voltage generator 27. The kickback voltage generator 27 may be included in the circuit in the form of a multivibrator which is energized by the horizontal deflection signals or may be constructed in the form of a winding included on the horizontal deflection wave output transformer. The kickback voltage generator performs the function of supplying a gate pulse 29 during the horizontal blanking period. This gate pulse 29 controls the burst separator 31 which is a gate circuit to which is applied the color television signal from the color television signal receiver 13. The gating pulse 29 opens the gate during the interval of the color synchronizing burst. The separated burst is applied to the burst sync reference signal source 33. The burst sync reference signal source 33 thereupon provides a reference signal having a frequency of 3.58 mcs. and a phase which is in synchronism with the phase of the color synchronizing burst. The output of the burst sync reference signal source 33 is applied to the phase adjuster 35 whose output circuit provides a 3.58 mc. signal having a phase which will be useful for utilization in the circuits to be described.

The television signal receiver 13 also provides color television signals to the Y delay line 39 and the Y amplifier 41 which amplifies and delays the Y or luminance signal. The band pass filter 37 removes those picture components which do not lie in the range from substantially 3 to 4.2 mcs. The output signals from the band pass filter 37 and the Y amplifier 41 are applied to the synchronous gain controlled amplifier 43 wherein the gain is changed at the chrominance subcarrier frequency. The synchronous gain controlled amplifier 43 is controlled by a 3.58 mc. reference signal provided by the phase and amplitude adjusting circuit 45. The 3.58 mc. reference signal is also supplied in proper phase to the control grid switching circuit 47 which develops at terminals 51 and 53 a control wave employed to guide the electron beam of the color switching sequential display device 19 to elemental color areas on the target corresponding to the color signal which is being applied to the cathode 18 and the control grid 20.

Since the color difference signals, $R-Y$, $B-Y$ and $G-Y$, have different relative amplitude levels in the chrominance signal, the chrominance signal cannot be applied without modification to the image reproducing device 19. By changing the gain of the chrominance signal amplifier at the 3.58 mc. rate so that the relative difference in amplitude of the color difference signals and therefore the color balance described by these color difference signals is compensated for, the modified chrominance may then be applied to the color switching sequential device 19.

Figures 2, 3:
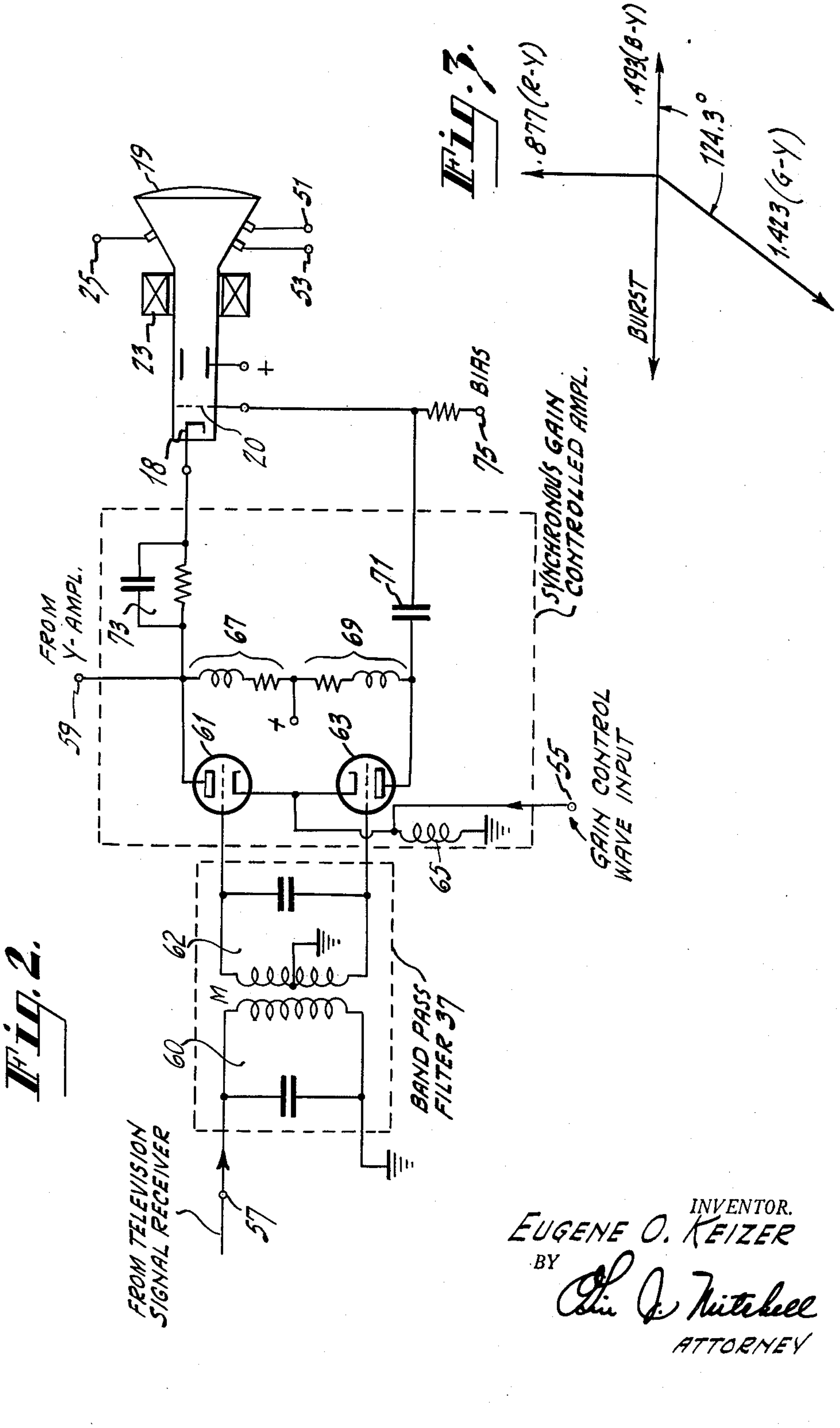
Figure 2 shows a schematic diagram of a chrominance signal amplifier whose gain is changed synchronously with the frequency and phase of the chrominance signal subcarrier.
Figure 3 shows a vector diagram illustrating the phases and amplitudes of the $R-Y$, $B-Y$, and $G-Y$ color difference signals relative to the color synchronizing bursts.

In order to understand more fully how the synchronous gain controlled amplifier 43 performs the functions of chrominance signal amplitude control, or color difference signal amplitude level compensation, consider the operation of the circuit shown in Figure 2 which illustrates one embodiment of the present invention.

The synchronous gain controlled amplifier circuit shown in Figure 2 operates in conjunction with the color switching sequential display device 19 in a manner whereby demodulation is effectively performed within the color switching sequential display device 19. The circuit illustrated in Figure 2 is given by way of example, of the circuits embodying a separate demodulator to provide color difference signals which can be utilized in conjunction with synchronous gain controlled amplifiers and an appropriate type of color image reproducer.

In Figure 2 the color television signal is applied to the input terminal 57 of the band pass filter 37. The band pass filter 37 comprises a pair of coupled circuits having a resonant primary 60 and a resonant secondary 62. The resonant primary 60 and the resonant secondary 62 are both tuned and coupled in a manner which yields a pass band from substantially 3 to 4.2 mcs. The resonant secondary 62 is connected so that its inductance is center tapped to ground, with the output terminals then connected so that the chroma or filtered color television signal is impressed in one phase on the control grid of the tube 61 and an inverted phase at the control grid of the tube 63. The information which reaches the control grids of the tubes 61 and 63 is still in the form of a color modulator subcarrier or chrominance signal, hereinafter referred to as chroma, whose subcarrier frequency is 3.58 mcs. The signal provided by the phase and amplitude adjuster 45 shown in Figure 1 is an appropriately phased 3.58 mc. signal which is developed across the inductance 65 in a manner which controls the potential of the mutually connected cathodes of tubes 61 and 63. The gain of tubes 61 and 63 is therefore controlled by the signals from the phase and amplitude adjuster 45 to an extent depending upon the amplitude of the signal; because the circuit is balanced, the synchronous gain control amplifier 43 does not perform the function of demodulation.

The output load of tube 61 is the output circuit 67; the output load of the tube 63 is the output circuit 69. Output circuits 67 and 69 both include a resistor in series with an inductance with the resistor and inductance so chosen in value as to yield wide band operation to the amplification functions of tubes 61 and 63.

Because the chroma signals applied to the grids 61 and 63 are 180° out of phase, the current to the anode of the tube 61 increases as the current to the anode of tube 63 decreases and vice versa. This yields an additive effect so far as the potentials developed in the anodes of tubes 61 and 63 are concerned so that the chroma is delivered at increased gain between the cathode 18 and the control grid 20 of the color switching sequential display device 19. The use of the RC network 73 is used to prevent surges from damaging the cathode 18 of the color switching sequential display device 19.

The color demodulating action that takes place in the color switching sequential display device 19 causes a sampling of the chroma information applied to the cathode 18 and the control grid 20. For example, when the color grid switching circuit 47 causes the scanning electron beam of the color switching color display device 19 to impinge on an elemental area having color light output characteristics corresponding to green, for example, the sampling action yields $G-Y$ information. By also applying the Y information to the anode of tube 61 there is accomplished an addition of the Y and $G-Y$ information during the time interval at which green light emitting cathode luminescent material is being impinged by the electron beam. When the electron beam is caused to impinge on cathode luminescent material having red light emitting characteristics, $R-Y$ information is sampled from the chroma and added to the Y to yield red information. In like manner, when the electron beam is caused to impinge on cathode luminescent material having blue light emitting characteristics, $B-Y$ information is sampled in the chroma and caused to be added to Y information to yield blue information.

The gain control wave applied to the input terminal 55 and across the cathode impedance consisting of the inductance 65, serves to simultaneously control the gain of both tubes 61 and 63. The gain control wave has a frequency of 3.58 mcs. Since the $R-Y$, $B-Y$, and $G-Y$ signals are related in amplitude according to the proportions 0.877, 0.493, and 1.423, respectively, when the 3.58 mc. gain control wave developed across the inductance 65 is near to its maximum value, the gain of tubes 61 and 63 will be reduced to decrease the level of the *G—Y* information. When the amplitude of the 3.58 mc. gain control wave is near a minimum, the gain of tubes 61 and 63 will be increased to increase the level of the *B—Y* information. Color balance may thus be accomplished by properly adjusting the phase and amplitude of the 3.58 mc. signal provided by the phase and amplitude adjuster 45 of Figure 1. The phase adjuster 35 of Figure 1 yields a 3.58 mc. signal to the color grid switching circuit 47 which controls the color switching of the color switching sequential display device 19.

The phase adjuster 35 will also provide sampling phase adjustment so that the proper synchronization of the sampling process will take place within the color switching sequential display device 19. The combination of phase adjuster 35 and the phase and amplitude adjuster 45 permits color signal sampling in synchronism with the action of the color grid switching circuit 47 thereby resulting in the reconstruction of the color image on the face of the color switching sequential display device 19. In order for high fidelity picture rendition to be achieved, the balanced gain controlled amplifier 43 is designed to have a wide band output preferably in excess of 7 mcs. so that the modified picture components may be accommodate. After color balance has been effected, the 3.58 mc. subcarrier is no longer a wave whose phase and amplitude variations can be described by signal components limited to 4.2 mcs. and as a result a wider pass band amplifier is required.

Figure 4:
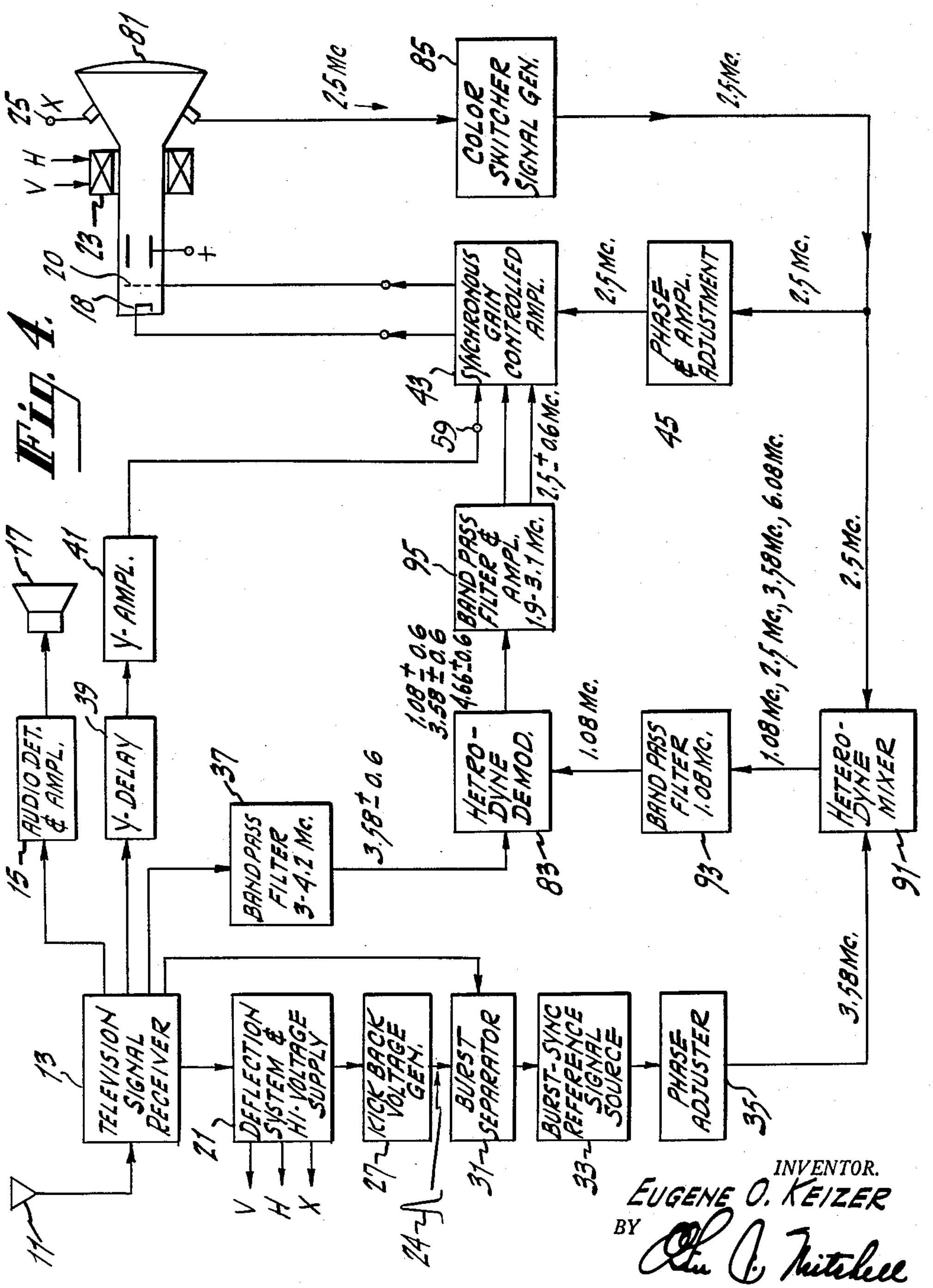
Figure 4 shows by block diagram another form of this invention.

When the sampling rate and the color information switching rate differs from 3.58 mcs., the present invention may be employed in another one of its forms. In Figure 4, there is shown, for example, a color timing signal producing type of display device 81 utilizing the principles described by Harold B. Law in his U.S. Patent 2,633,547, entitled "Two-Sided Electron Sensitive Screen." In the Law patent referred to, there is shown a vertical line phosphor screen. Control signals are derived from the electron beam striking the rear surface of the screen on areas of cathode luminescent material. Tubes of this type have employed ultraviolet light-emitting cathode luminescent materials in conjunction with a photocell to provide timing or triggering indicating scanning beam registration. These timing or triggering signals are useful for synchronizing control of the time sequential sampling process or synchronous demodulation of the color information from the chroma information signal.

Consider the performance of the embodiment shown in Figure 4 wherein the sequential display device 81 is of the type which yields color timing signals depending upon the position of the scanning electron beam. It is necessary that suitable color signals be applied to the cathode terminal 18 in the control grid terminal 20 in synchronism with the position of the scanning electron beam as it travels from one color light emitting segment to another. For the purpose of explanation, it will be assumed that the embodiment shown in Figure 4 employs a sequential display device whose sampling frequency is at 2.5 mcs. This 2.5 mc. rate is 1.08 mcs. lower in frequency than the frequency of the color subcarrier.

The general characteristics of the circuit shown in Figure 4 are similar to those of the circuit shown in Figure 1. The audio information is produced at the loud speaker 17. The 3.58 mc. reference signal is developed at the output of the phase adjuster 35; the chroma signal is available at the output of the band pass filter 37, and the Y signal is available at the terminal 59. The 2.5 mc. signal developed by the sequential display device 81 operates the color switcher signal generator 85 which provides a 2.5 mc. sine wave to the heterodyne mixer 91. A 3.58 mc. signal from the phase adjuster 35 is also applied to the heterodyne mixer 91. The output signal of the heterodyne mixer 91 including the difference frequency signal at 1.08 mc. is applied to the pass band filter 93 that passes only the 1.08 mc. signal. The 1.08 mc. signal and the output of the band pass filter 37 which contains chroma information in the range from approximately 3 to 4.2 mcs., are applied to the heterodyne demodulator 83. The output signal of the heterodyne demodulator 83 contains harmonic waves of frequency translated chroma information, now in the frequency range from 1.9 to 3.1 mcs. and having a mean subcarrier frequency of 2.5 mcs. The band pass filter and amplifier 95 passes only those harmonic components in the range from 1.9 to 3.1 mcs., and by utilizing suitable phase splitting apparatus, impresses this chroma information on the synchronous gain control amplifier 43 in both normal and reverse polarity.

The synchronous gain controlled amplifier 43, upon receiving the Y information from the terminal 59 and the 2.5 mc. signal as provided by the phase and amplitude adjustment circuit 45, and the chroma information in both normal and reversed polarity from the pass band filter 95 then operates in the manner described in connection with the circuit shown in Figure 2. The wide band gain controlled chroma signal is applied between the cathode 18 and the control grid 20, and the Y signal is applied to the cathode 18 of the color image reproducer 81. Time sequential sampling is then produced within the sequential display device 81 in proper phase depending on the adjustments of the phase adjuster 35 and the phase and amplitude adjuster 45 to yield the recovered color television image.

Having described the invention, what is claimed is:

1. In a signalling system, the combination of, a source of a subcarrier signal having a mean frequency and modulated by a plurality of modulating signals, and wherein each of said plurality of modulating signals is represented by a predetermined phase of said subcarrier signal and by a predetermined relative amplitude, heterodyning means coupled to said source for changing the frequency of said subcarrier signal from said mean frequency to a second mean frequency, an amplitude control means coupled to said heterodyning means for altering the instantaneous amplitude of said heterodyned subcarrier signal at a rate equal to said second mean frequency, a signal utilization means, and means to apply said amplitude altered subcarrier signal to said signal utilization means.

2. A color television receiver comprising in combination, means for developing a subcarrier wave modulated in accordance with a plurality of different selected component colors of a televised image, means for amplifying said subcarrier wave, said amplifying means including heterodyning means for changing the frequency of said subcarrier wave, color balance control means to alter the relative signal amplitudes of said different selected component colors as represented in said frequency changed subcarrier wave, said color balance control means including a balanced gain control amplifier for said subcarrier wave and a source of a gain control signal consisting of an oscillation at the frequency of said changed subcarrier wave; and means for reproducing said color image from said amplified and altered subcarrier wave.

3. In a color television receiver, the combination of, a source of phase and amplitude modulated subcarrier waves containing modulations derived from color information signals and having a prescribed mean frequency; a source of a signal wave having a predetermined waveform, amplitude, and timing, and substantially said prescribed mean frequency; a gain controlled amplifier coupled to said subcarrier wave source and said signal wave source for utilizing said signal wave for altering the instantaneous amplitude of said phase and amplitude modulated subcarrier waves to provide color balance of said color information signal; and a single-gun tri-color kinescope coupled to the output of said gain controlled amplifier.

4. A color television receiver comprising, a color image reproducer having at least a color control terminal and in which different component colors of an image are reproduced selectively at a predetermined frequency, means for developing at least a color television signal including a color modulated subcarrier having a mean frequency corresponding to said predetermined frequency and containing information signals relative to a plurality of color difference signals of said information, each signal having an associate phase as compared to a reference phase and a prescribed relative amplitude level, means for applying said color modulated subcarrier to said color control terminal of said color image reproducer to produce color difference signal demodulation of said color modulated subcarrier within said color image reproducer, means for developing a signal having the frequency corresponding to the predetermined frequency, means to control the phase and amplitude of the developed signal, and a balanced gain controlled amplifier for varying said color modulated subcarrier in amplitude during prescribed portions of each cycle of said mean color subcarrier frequency whereby the relative amplitude of each component color difference signal demodulated by said color image reproducer is caused to be at an amplitude suitable for correct reconstruction of a transmitted color image by said color image reproducer.

5. A color television receiver comprising, a color image reproducer having at least a color control electrode and capable of producing different component colors in sequence at a predetermined frequency, said color television receiver including means for receiving a color television signal including a modulated color subcarrier having a mean subcarrier frequency and containing information signals relative to a plurality of color difference signals each of said information signals represented by a predetermined phase as compared to a reference phase, and each having a prescribed relative amplitude level, means for providing time sequential sampling of the modulated color subcarrier in said color image reproducer to provide color difference signals in sequence when the modulated color subcarrier is applied to said color control electrode at said predetermined frequency, means for producing a signal of mean subcarrier frequency and having a predetermined phase and amplitude, a gain control means for effecting color balance, means for applying said color modulated subcarrier through said gain control means, means to apply said produced signal to said gain control means to control the instantaneous gain of said gain control means, and means for coupling the output of said gain control means to said color control electrode.

6. In a color television receiver, the combination of, a color image reproducer including a scanning electron beam and an electron beam sensitive color target area whereon the impingement of said scanning electron beam produces color light emission having a prescribed color sequence and a frequency of component color selection, an electron beam modulation control means, a source of a color modulated subcarrier having a prescribed mean color subcarrier frequency and containing color difference information signals each having a predetermined phase as compared to a reference phase and each having a prescribed relative amplitude level when included in said color modulated subcarrier, means for adjusting the prescribed mean subcarrier frequency of said color modulated subcarrier to said frequency of component color selection, a source of a signal wave having a predetermined wave form of prescribed amplitude and timing and having substantially said frequency of component color selection, means coupled to said signal wave source and to said frequency adjusting means for utilizing said signal wave for altering the instantaneous amplitude of said frequency adjusting color modulated subcarrier to provide a prescribed color balance of said color difference information signals, and means for coupling said color modulated subcarrier instantaneous amplitude altering means to said electron beam modulation control means.

7. In a color television receiver, the combination of, color image reproducer including a scanning electron beam and an electron beam sensitive color target area whereon the impingement of scanning electron beam produced color light emission having a prescribed color sequence at a frequency of component color selection, a source of a color modulated subcarrier having a prescribed mean subcarrier frequency and containing color difference information signals each having predetermined phase as compared to a reference phase, and each having a first prescribed relative amplitude level when included in said color modulated subcarrier, means for developing a first signal having said frequency of component color selection, means for developing a second signal having a frequency which is substantially said prescribed mean subcarrier frequency, a first heterodyning means coupled to said first signal means and to said second signal means to develop a third signal having a frequency which is the difference between the frequency of said first signal and the frequency of said second signal, a second heterodyning means coupled to said first heterodyning means and said color modulated subcarrier source for developing a frequency altered color modulated subcarrier having a mean frequency at said frequency of said component color selection, signal amplitude control means coupled to said second heterodyning means and to said first signal means for altering the relative amplitude of each of the color difference information signals contained in said second frequency altered color modulated subcarrier, and means coupled to said amplitude control means and to said electron beam modulation control means for utilizing said amplitude altered second frequency altered color modulated subcarrier to modulate said scanning electron beam.

8. In a color television receiver, the combination of, a color image reproducer having at least a color control terminal and in which different component colors of an image are reproduced selectively at a predetermined frequency, means for developing a color modulated subcarrier having a mean subcarrier frequency and containing color difference information signals each having a prescribed phase as compared to a reference phase and having relative amplitudes at a level constituting a first degree of color balance, a heterodyning circuit coupled to said color modulated subcarrier source for adjusting the frequency of said color modulated subcarrier to provide a mean frequency of substantially said predetermined frequency at which different component colors of said image are selectively produced on said color image reproducer, a gain control circuit means operatively connected with said heterodyning circuit and coupled to said color control terminal to cause selected portions of each cycle of said heterodyned color modulated subcarrier to be varied in amplitude according to a second degree of color balance.

9. In a color television receiver, the combination of a source of phase and amplitude modulated subcarrier waves having a prescribed mean frequency and being representative of different relative amplitudes of respectively different color difference signals at certain phases thereof, a source of a signal wave having substantially said prescribed mean frequency, means coupled to said subcarrier wave source and said signal wave source for utilizing said signal wave to alter the amplitude of said phase and amplitude modulated subcarrier waves such as to produce a phase and amplitude modulated subcarrier wave output representative of similar relative amplitudes of said respectively different color difference signals at said certain phases, said last named means comprising means coupled to said subcarrier wave source for amplifying said subcarrier waves, and means coupled to said signal wave source for controlling the gain of said amplifying means in accordance with said signal wave.

References Cited in the file of this patent

UNITED STATES PATENTS

| | | |
|---|---|---|
| 2,653,187 | Barton | Sept. 22, 1953 |
| 2,680,147 | Rhodes | June 1, 1954 |
| 2,681,379 | Schroeder | June 15, 1954 |
| 2,736,765 | Lohman | Feb. 28, 1956 |
| 2,757,229 | Larky | July 31, 1956 |
| 2,798,900 | Bradley | July 9, 1957 |
| 2,891,152 | Altes | June 16, 1959 |

OTHER REFERENCES

Color TV, Rider Pub., March 1954, pp. 141 and 142. Copy in Div. 16.

Introduction to Color Television, Admiral Corp., February 1954, pages 17 to 27. Copy in Div. 16.